(12) United States Patent
Mangin et al.

(10) Patent No.: US 7,804,812 B2
(45) Date of Patent: Sep. 28, 2010

(54) METHODS AND DEVICES OF ERROR CONTROL WITH FEEDBACK RESOURCE ALLOCATION SCHEME

(75) Inventors: Christophe Mangin, L'Hermitage (FR); Romain Rollet, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1527 days.

(21) Appl. No.: 11/016,836

(22) Filed: Dec. 21, 2004

(65) Prior Publication Data

US 2005/0201339 A1   Sep. 15, 2005

(30) Foreign Application Priority Data

Jan. 8, 2004   (EP) .................... 04290053

(51) Int. Cl.
*H04J 3/00*   (2006.01)

(52) U.S. Cl. ................ 370/345; 370/347; 370/349; 370/352; 455/450; 455/515; 455/550.1; 455/552.1

(58) Field of Classification Search ........... 370/345, 370/347, 349, 352; 455/450, 515, 550.1, 455/552.1

See application file for complete search history.

(56) References Cited

U.S. PATENT DOCUMENTS

| | | | |
|---|---|---|---|
| 6,519,223 | B1 | 2/2003 | Wager et al. |
| 6,567,459 | B1 * | 5/2003 | Hakkinen et al. ........... 375/132 |
| 6,975,611 | B1 * | 12/2005 | Balachandran et al. ...... 370/337 |
| 2004/0228333 | A1 * | 11/2004 | Schnell et al. ............... 370/352 |
| 2004/0268351 | A1 * | 12/2004 | Mogensen et al. .......... 718/100 |
| 2005/0249148 | A1 * | 11/2005 | Nakamata et al. ........... 370/328 |
| 2006/0198325 | A1 * | 9/2006 | Gao et al. ................... 370/270 |
| 2006/0277450 | A1 * | 12/2006 | Zaki et al. ................... 714/708 |
| 2008/0070611 | A1 * | 3/2008 | Yi et al. ..................... 455/515 |
| 2008/0175265 | A1 * | 7/2008 | Yonge et al. ................ 370/447 |

FOREIGN PATENT DOCUMENTS

| | | |
|---|---|---|
| EP | 1 111 832 A2 | 6/2001 |
| EP | 1 263 159 A1 | 12/2002 |
| EP | 1 309 121 A1 | 5/2003 |
| GB | 2 384 145 A | 7/2003 |

* cited by examiner

*Primary Examiner*—Dwayne D Bost
*Assistant Examiner*—Inder P Mehra
(74) *Attorney, Agent, or Firm*—Oblon, Spivak, McClelland, Maier & Neustadt, L.L.P.

(57) ABSTRACT

There is disclosed a method and a device of controlling transmission errors in a network comprising at least one transmitter, at least one receiver and a Radio Resource Management (RRM) unit for allocating transmission resource dedicated to the transmitter and/or the receiver. A FeedBacK (FBK) function is introduced to manage transmission of feedback information which is transmitted by the receiver to the transmitter to indicate transmission errors. The FBK function comprises a transmitter FBK instance and a receiver FBK instance. At first, the transmitter FBK instance transmits Protocol Data Units (PDUs) to the receiver FBK instance. The FBK function monitors transmission errors on the receiver FBK instance side and/or on the transmitter FBK instance side to determine a transmission quality level out of a set of given transmission quality levels. The FBK function selects one feedback operational mode out of a predetermined list of feedback operational modes based on the determined transmission quality level, each one of feedback operational modes defining a feedback resource allocation scheme for the transmitter FBK instance and the receiver FBK instance. The receiver FBK instance transmits to the transmitter FBK instance feedback information via a resource allocated based on the selected feedback operational mode.

23 Claims, 4 Drawing Sheets

METHODS AND DEVICES OF ERROR CONTROL WITH FEEDBACK RESOURCE ALLOCATION SCHEME

BACKGROUND OF THE INVENTION

1. Technical Field

The present invention relates generally to communication networks, and more particularly to the management of packet transmission errors.

2. Related Art

There is a continuously growing need to exchange information via communication networks in order to transmit larger and larger data files. This phenomenon is accentuated with the development of the multimedia applications. This explains why the variety of communication networks now available has a common objective: rapidity and efficiency of the transmission. Actually, these characteristics are required in order to consume less transmission resource and thus to allow more and more users to communicate through any communication network and to transmit increasing volumes of data. In addition, reliability of the transmission appears to be a key characteristic. On the other hand, the transmission error rate depends on the type of medium used by communication networks. In particular, wireless medium is generally not very reliable. Indeed, these wireless networks are prone to relatively high error levels.

As a result, this type of networks integrates an Error Control (EC) entity to deal with their intrinsic high transmission error levels. In usual networks based on communication protocols stack according to the OSI ("Open System Interconnect") model of ISO ("International Standardization Organization"), an EC entity is included in the Data Link Layer (LL) in order to manage retransmissions of corrupted packets. In the following description, the term "resource" will be referred to as "transmission resource".

Classically, an EC entity is in charge of guaranteeing correct packet transmission. Stated otherwise, an EC entity manages the retransmission of corrupted or missing packets in case of transmission errors. Many types of EC entities have heretofore been proposed for many types of networks. However, in the following description, will only be considered wireless networks because they are the most critical networks due to their not really reliable transmission medium. Moreover in such networks, the transmission resource is limited. As a result, the efficiency of an EC entity becomes a key aspect. Regarding the foregoing, an efficient Medium Access Control (MAC) layer is required to share the resource provided by the PHYsical (PHY) layer without adding too much signalling overhead.

The following will consider the types of EC entity already available in the prior art. The direction used to transmit data will be referred to as "Forward direction", whereas the reverse direction used to return feedback information will be referred to as "Backward direction". An EC entity based on an Automatic Repeat reQuest (ARQ) protocol is usually used to perform a data transmission providing an error-free service to the upper layer. An ARQ protocol is used in an EC entity for data packets transmission in which the receiver can detect a transmission error and then automatically transmits a repeat request to the transmitter. As a result, the transmitter retransmits the corresponding data packets until they are either correctly received or the number of retransmission attempts exceeds a predetermined threshold.

Generally, the ARQ protocols rely on a packet identification scheme common to the transmitter and the receiver, so that the receiver can indicate to the transmitter, which packets are not correctly received through a feedback information message. The packet identification is typically an incremental Sequence Number (SN) identifier. In order to avoid stopping the transmitter to send data while waiting for feedback information each time a packet is transmitted, a sliding window mechanism, well known in the art, is implemented.

In some implementations of this type, in case of transmission error, the transmitter retransmits all packets comprised in the sliding window even if some of them have been correctly received, well known as "Go-back-N" algorithms. As a result, a data packet overhead is generated by packet retransmissions. A solution to limit resource used by packet retransmissions consists in implementing a Selective Repeat scheme. In such a scheme, the feedback information message typically comprises the identifiers of incorrectly received packets, consequently only the incorrectly received packets are retransmitted by the transmitter. The Selective Repeat ARQ scheme can efficiently support data transmission with high throughputs and minimises the number of packet retransmission. However, an ARQ function on a receiver shall be able to periodically send feedback information messages to an ARQ function on a transmitter so that the sliding window can progress even when all packets are received correctly. Consequently, the amount of resource required for the feedback information messages transmission depends directly on the packet error rate since the amount of information sent in the feedback information messages, in this case, is function of the number of corrupted packets. At last, the amount of resource required for packets retransmission is proportional to the number of corrupted packets indicated in the feedback information messages. This type of scheme can be profitable to reduce the mean transmission delay as experienced by the upper layer. However, the resource consumed by the feedback information messages can be very important, mainly in case of transmission error bursts, above all when a Selective Repeat ARQ scheme is implemented. Consequently, another important aspect is to control the resource allocated for feedback transmission and the signalling overhead generated by the signalling protocol used to request a feedback resource allocation, as will be detailed in the following.

In a centralised resource allocation scheme, a specific device, called RRM unit, allocates the resource based on the received Resource Request messages sent by the different devices. A centralised Time Division Multiple Access (TDMA) MAC protocol based on a fixed MAC Frame Time Interval (FTI) is preferably adopted in such a scheme. When the transmitter ARQ function and the receiver ARQ function are not co-located within the RRM unit, an important signalling overhead may be generated by the EC entities. Indeed, the RRM unit first allocates a resource for the transmitter to allow the transmission of the Resource Request message from the transmitter to the RRM unit. Then, the RRM unit allocates a resource for data transmission from the transmitter to the receiver. Finally, the RRM unit allocates a resource for a feedback information transmission from the receiver to the transmitter.

To simplify this scheme and to limit the overhead generated by an ARQ scheme in order to save resource, the RRM unit can implicitly allocate resource in the backward direction, i.e. without exchanging any signalling messages. However, the RRM unit does not have knowledge of the state of the receiver ARQ function and consequently the resource allocation for feedback information messages performed by the RRM unit is not based on the transmission error detection. This solution can only be efficiently implemented when the RRM unit is co-located with the receiver ARQ function. If not, it may lead to either a lack of resource for feedback information messages when a burst of errors occurs, inducing an undetermined retransmission delay, or a waste of resource when all packets are correctly received. This signalling overhead can be accentuated with some operations performed by the PHY layer for synchronisation and channel estimation purposes, even if the size of transmitted data payload is small, which is generally the case for an ARQ signalling message. Moreover, the overall PHY layer overhead size depends, in the best case, on the number of transmitters in a given FTI. The PHY layer overhead can be significantly reduced if the number of transmitters in each FTI is reduced. FIG. 1 illustrates a feedback resource allocation scheme which is not implicitly performed. In case of transmission error detection, the transmitter ARQ function, respectively the receiver ARQ function sends a Resource Request message for data transmission 11, respectively a resource request message for signalling 12, to the RRM unit. The transmitter ARQ function retransmits data packets 14 to the receiver. Then, the receiver ARQ function sends a feedback information message to the transmitter via the resource 13 allocated by the RRM unit. FIG. 2 illustrates a usage of resource within the FTIs FTI#1, FTI #2 and FTI #3. In the FTI FTI#1, the transmitter ARQ function transmits a Resource Request message 21. Upon reception of this message 21, the RRM unit allocates in the next FTI which is the FTI FTI#2, the resource to the transmitter used to send a data packet 22. In the FTI FTI#2, the transmitter ARQ function sends another Resource Request message 23 to the RRM unit and then it is allocated a resource in the next FTI which is the FTI FTI#3. This resource is used by the transmitter to send a data packet 24. On the other hand, the receiver ARQ function sends a Resource Request message 26 to the RRM unit in the FTI FTI#2 in order to request a feedback resource. Consequently, the RRM unit allocates in FTI FTI#3 a resource to the receiver, used to send a feedback information message 27. The receiver ARQ function requests a feedback resource in the FTI FTI#3 via a Resource Request message 28 to be able to transmit the feedback information message in a next FTI. In such a feedback resource allocation scheme, the receiver ARQ function periodically requests some feedback resource via signalling messages.

Summarizing the preceding, an EC entity is very useful, mainly within networks using unreliable medium, such as wireless networks. But these types of networks manage a scarce resource and the known mechanisms required by an EC entity consume a lot of resource as it has been explained above. Actually, an EC entity requires feedback information messages, packets retransmission messages and consequently a feedback resource allocation scheme. It is to be noted here that a feedback resource allocation scheme consumes resource using specific resource allocation signalling messages when the allocation is not implicitly performed. Moreover, when a given EC scheme is designed to support high error rates, it generates resource waste in free-error transmission. As opposed to that, when a given EC scheme is designed to support to a low error rate, it is not adapted to high error rates, as it has been explained above. Stated otherwise, these types of EC schemes generate signalling overhead and/or packet retransmission overhead.

SUMMARY OF THE INVENTION

In view of the foregoing, mainly in a system based on TDMA scheme; there is a need for an EC entity guaranteeing the retransmission of corrupted or missing packets, while decreasing the signalling overhead generated for the feedback resource allocation, and very adapted in case of reliable medium as well as in case of unreliable medium. Stated otherwise, there is a need for an EC entity being efficient in case of high as well as low transmission error rates. The present invention proposes such an EC scheme.

In a first aspect, the invention proposes a method of controlling transmission errors in a network comprising at least one transmitter, at least one receiver, a Radio Resource Management (RRM) unit for allocating transmission resource dedicated to the transmitter and/or receiver, and a FeedBacK (FBK) function comprising a transmitter FBK instance and a receiver FBK instance for managing transmission of feedback information which is transmitted by the receiver to the transmitter to indicate transmission errors, the method comprising the following steps:

a) the transmitter FBK instance transmits Protocol Data Units (PDUs) to the receiver FBK instance;
b) the FBK function monitors transmission errors on the receiver FBK instance side and/or on the transmitter FBK instance side to determine a transmission quality level out of a set of given transmission quality levels;
c) the FBK function selects one feedback operational mode out of a predetermined list of feedback operational modes based on the determined transmission quality level, each one of the feedback operational modes defining a feedback resource allocation scheme for the transmitter FBK instance and the receiver FBK instance;
d) the receiver FBK instance transmits to the transmitter FBK instance feedback information via a resource allocated based on the selected feedback operational mode.

A second aspect of the invention relates to a device for controlling transmission errors comprising means for carrying out the method according to the first aspect.

BRIEF DESCRIPTION OF THE DRAWINGS

Further features and advantages of the present invention will become more apparent from the description below. The latter is given purely by way of illustration and should be read in conjunction with the appended drawings, of which.

DESCRIPTION OF PREFERRED EMBODIMENTS

Figure 1:
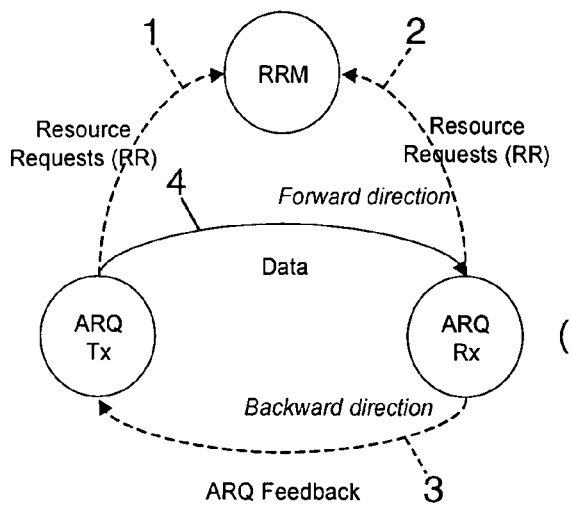
FIG. 1 and FIG. 2 illustrate an ARQ scheme of the prior art. They have been already described.
Figure 2:
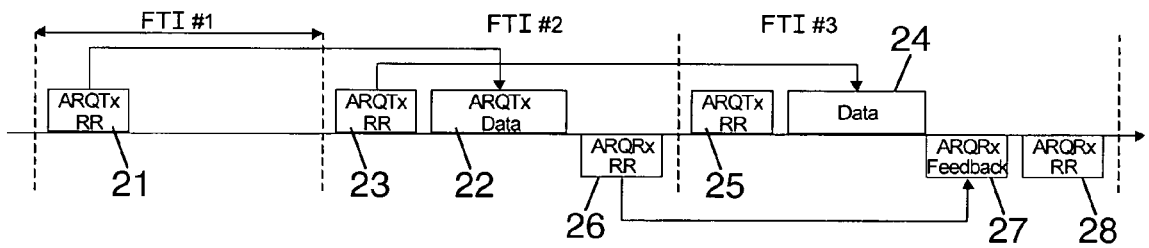

One exemplary embodiment of the present invention takes place in a network comprising STAtions (STAs) including a communication protocols stack based on the OSI model of ISO. More particularly, a preferred embodiment of the invention is described here in one exemplary network as it is described below. Of course the scope of the invention encompasses applications to any stack of communication protocol layers and to other types of networks.

The STAs which are able to communicate between themselves are grouped together in a cell. A centralised TDMA MAC protocol based on a FTI is a scheme preferably adopted. A Radio Resource Management (RRM) unit is in charge of distributing the resource provided by the PHY layer among the STAs within the cell. In a TDMA scheme, a resource allocated to a given STA is a reserved time interval referred to as "dedicated access resource" in which the STA can transmit data over the medium. Preferably, a dedicated access resource may have a variable duration and may be dynamically granted on a per FTI basis according to the requirements of the STAs. At the MAC layer level, a STA can transmit in a dedicated access resource the data traffic received from an upper layer of its protocol stack. In addition, it can also transmit signalling messages generated by the different entities of the LL, such as a MAC entity or an EC entity, to a destination STA or to the RRM. STAs indicate their resource requirements to the RRM unit through specific MAC signalling messages which will be referred to as "Resource Request messages". In one embodiment of the present invention, according to those requirements, the RRM unit distributes the resource contained within each FTI and indicates the FTI composition to the STAs through specific MAC signalling messages typically sent at the beginning of the FTI. Such a protocol allows the RRM unit to adjust to the variable requirements of the STAs. Preferably, the RRM unit further provides some contention access resource in the FTIs which is resource available for all STAs of the cell via a contention access. Consequently, the STAs which do not have dedicated access resource in FTIs can still have a chance to access the medium. Preferably, the contention access resource is split into fixed duration slots used to send signalling messages fitting in those slots. The access to this contention access resource may be performed by respecting a Slotted Aloha procedure.

One STA will be referred to as a transmitter FBK instance and another one will be referred to as a receiver FBK instance. The LL layer of the transmitter FBK instance receives packets referred as LL Service Data Unit (LL-SDU) packets locally from an upper layer. Packets exchanged between two LL entities in the network are encapsulated in MAC Protocol Data Unit (MAC-PDU) packets, which are transmitted over the PHY layer. In one embodiment of the invention, each packet will be identified by a Sequence Number (SN) identifier. Of course any type of identifier may be used in the invention. Such a SN identifier is contained in a MAC-PDU header. A MAC-PDU further comprises a received LL-SDU packet as data payload. In a preferred embodiment of the invention, a Cyclic Redundancy Code (CRC) information, which protects the complete MAC-PDU, is used to detect a data corruption linked to a transmission error. Of course, the present invention encompasses any other method of data corruption detection. Preferably, the FBK function is dispatched in the network into several instances, a transmitter having a transmitter FBK instance and a receiver having a receiver FBK instance. Of course, the present invention encompasses any location of the FBK function in the network. Furthermore, each FBK function can comprise several dedicated transmitter and receiver FBK instances, each dedicated FBK instance handling a given specific data flow. A given data flow can be defined considering some characteristics such as priority or other Quality of Service parameters. For the sake of better understanding, the description considers only one type of data flow which is composed by a set of MAC PDUs sent by a transmitter to a receiver in the network. As before, the direction from the transmitter FBK instance to the receiver FBK instance is referred to as "Forward direction" and the direction from the receiver FBK instance to the transmitter FBK instance is referred to as "Backward direction". Of course in the following section, a feedback message is always transmitted in the backward direction, by the receiver FBK instance to the transmitter FBK instance.

Each FBK instance is based on a set of state variables and a memory structure to implement a feedback message transmission and a packet retransmission scheme. One embodiment of the invention is based on a sliding window scheme. An image of a FBK sliding window is preferably maintained on both transmitter FBK instance and receiver FBK instance. The size of the FBK sliding window, referred to as $K_W$, is preferably defined as a fixed size and negotiated between the transmitter and receiver FBK instances. The following sections describe at first the management of the sliding window and basic principles applied on the transmitter FBK instance side and then on the receiver FBK instance side.

In the transmitter FBK instance, the FBK sliding window comprises a Bottom of Window (Tx-BoW) and a Top of Window (Tx-ToW), which are respectively the first MAC PDU not positively acknowledged by the receiver FBK instance through a feedback message and the MAC PDU with the greatest SN that can be transmitted in accordance with the following rule:

$SN_{Tx-Tow}=SN_{Tx-Bow}+K_W-1$; $SN_{Tx-Tow}$ being the SN of the Tx-ToW packet and $SN_{Tx-Bow}$ being the SN of the Tx-BoW packet.

The transmitter FBK instance sends by increasing SN order MAC-PDUs which are within the FBK sliding window.

As a result, when the transmitter FBK instance transmits a MAC-PDU with a SN corresponding to $SN_{TX-ToW}$, the FBK sliding window is said closed. In such a condition, the transmitter FBK instance no longer transmits any MAC-PDU until reception of a feedback information message that lets the Tx-BoW progress. Of course, it is not desirable to have a closed sliding window on the transmitter FBK instance side. In addition, a preferred embodiment of the invention proposes to handle another reference in the window which is a transmitter FBK instance Last in Window (Tx-LiW). The latter refers to the transmitted MAC PDU, belonging to the window, with the highest SN.

In parallel, a Time To Live (TTL) timer is maintained for each MAC-PDU. The TTL timer is initialised based on information specified by the upper layer upon the LL-SDU reception. This type of timer is classically used and generally, upon a TTL timer expiration, the corresponding MAC PDU is not retransmitted even if an error transmission is detected. For that purpose, some ARQ implementations force the transmitter ARQ function to transmit a specific signalling message in order to force a sliding window progression and thus avoiding window closing effects, especially when the underlying transport is particularly prone to errors. This mechanism is commonly called "discard" and leads to upper layer packet loss. The present invention proposes an advantageous usage of this timer as it will be disclosed below.

On the receiver FBK instance side, the Bottom of Window (Rx-BoW) refers to the first MAC-PDU which has not been received yet or incorrectly received by the receiver FBK instance. The highest SN of the correctly received MAC-PDUs is referred to as a Last in Window (Rx-LiW). The receiver FBK instance detects a corrupted packet by calculating a CRC and is able to detect a missing packet when a MAC PDU with a SN greater than the SN of the missing packet has been correctly received.

Based on the technical principles disclosed above, an embodiment of the present invention proposes a method of error control for data transmission, which is advantageously adapted to handle high transmission error rate as well as an error-free transmission. It relies on the use of different feedback operational modes for feedback allocation resource, depending on the transmission errors detected. In one preferred embodiment, it relies on two feedback operational modes, a Reduced Feedback resource Allocation (RFA) and a Normal Feedback resource Allocation (NFA). The RFA mode is preferably selected during error-free periods in order to save PHY resource. Resource allocation for feedback is based on TTL timer information supplied by the upper layer, and the sliding window state. The NFA is preferably selected during period with bursts of errors and provides fast retransmission capability during such periods. The FBK function is in charge of selecting one of two feedback operational modes and performs this selection based on information returned by the receiver FBK instance as it is described below. In a classical ARQ scheme applied to a centralised resource allocation network, wherein an RRM unit is in charge of resource allocation, the receiver FBK instance detecting transmission errors requests a resource to the RRM unit to transmit corresponding feedback information to the transmitter FBK instance, as it has been already described. This step of resource request generates a signalling overhead. An embodiment of the invention allows to reduce this type of signalling overhead in that the resource for feedback is requested by the transmitter FBK instance instead of the receiver FBK instance. In order to accelerate the transition from RFA to NFA feedback operational mode, one embodiment of the invention uses contention access resource whenever this access method is provided by the MAC layer and an EC entity is located at the LL level. In that case, the MAC layer is in charge of guarantying the correct delivery of signalling messages sent via a contention slot. For instance, in a Slotted Aloha scheme, this function is performed by repeating the message after a random back-off period if the packet is not acknowledged by the receiver FBK instance. Anyway, this particular mechanism is out of the scope of the present invention.

In the following description, the transmitter FBK instance and the receiver FBK instance are different from the RRM unit. When one of the FBK instances is co-located with the RRM unit, some message exchanges can be internally performed which can improve the mechanism by reducing the overhead signalling and protocol latency.

Siqnalling Messages

One embodiment of the invention defines two types of feedback information messages, which are sent by the receiver FBK instance to the transmitter FBK instance: a Short Feedback (SF) message and a Detailed Feedback (DF) message. The SF message contains following information:
  the SN of the Rx-BoW;
  the SN of the Rx-LiW;
  the number $N_{RTx}$ of corrupted or missing PDUs which SN is included between Rx-BoW (not included) and Rx-LiW.

When the receiver FBK instance does not receive any MAC-PDU beyond the Rx-BoW, the Rx-LiW is equal to the Rx-BoW and the number $N_{RTx}$ is equal to 0. The receiver FBK instance can send a SF message through the MAC protocol by using either a dedicated access resource or a contention access resource. On reception of a SF message, the transmitter FBK instance is able to retransmit the Tx-BoW and all the PDUs between the Rx-LiW specified in the SF message and the Tx-LiW. However, the transmitter FBK instance is not able to retransmit only the corrupted PDUs located between the Rx-BoW and the Rx-LiW. The DF message contains the same information as the SF message and further comprises a list of identifiers of corrupted or missing PDUs, the identifiers being preferably the SNs of the MAC-PDUs as described above. The corresponding SNs are comprised between the specified $SN_{Rx-BoW}$ (not included) and the specified $SN_{Rx-LiW}$. The DF messages have a variable length. They are sent by the MAC layer preferably only via a dedicated access resource. When a resource allocated to the receiver FBK instance does not allow to transmit a complete list of SN in the corresponding DF message, especially when the list of SNs is long, the $N_{RTx}$ information contains the number of PDUs that remains to be listed in a next DF message. From this information, further resource for feedback can be requested and then allocated, and one or more next DF messages containing the remaining part of the list are transmitted. This case can occur particularly in a resource allocation system where the amount of resource allocated by the RRM has a variable length, as it has been described above. The PDUs should be preferably listed by increasing SN order in order to improve the performance.

Figure 3:
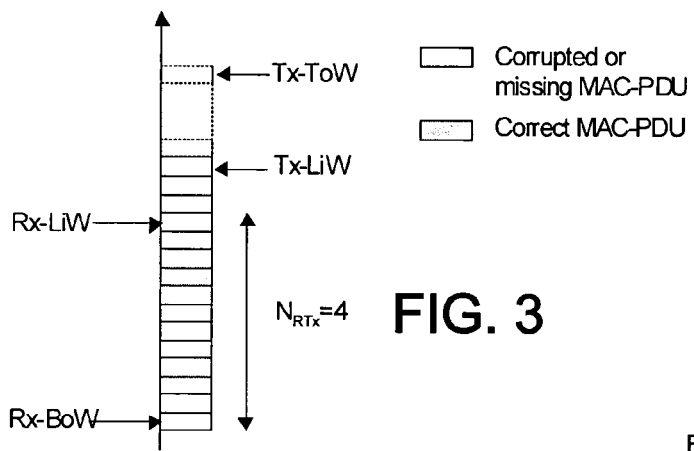
FIG. 3 illustrates a sliding window according to one embodiment of the present invention.

FIG. 3 illustrates a sliding window where corrupted or missing packets are represented in blank and correct packets are represented as shading. In this example, the transmitter FBK instance has transmitted PDUs not yet acknowledged until the level of the Tx-LiW. The receiver FBK instance detects a number $N_{RTx}$ equal to 4 of corrupted or missing packets between the Rx-BoW and the Rx-LiW. Upon reception of the next feedback message, the transmitter FBK instance is able to retransmit Rx-BoW and all PDUs between the Rx-LiW (not included) and the Tx-LiW if it is a SF message. If it is a DF message, the transmitter FBK instance is able to retransmit, in addition, the MAC-PDUs specified in the message between the Rx-Bow and the Rx-LiW.

In one embodiment of the invention two main methods are described to force the receiver FBK instance to transmit feedback information via a dedicated access resource allocated to the receiver FBK instance. A first one, referred to as an Explicit feedback reply method, is based on the transmission of a Request for FeedBack (RFB) message by the transmitter FBK instance to the receiver FBK instance but this method presents the disadvantage of generating signalling overhead. A second one, referred to as an Implicit feedback reply method, requires that the receiver FBK instance transmits feedback information each time a dedicated access resource is allocated. The present invention encompasses both preceding methods. For the sake of understanding, the following section describes the second one, the first being easily deduced from the second one.

A Resource Request for Signalling (RRS) message is a message transmitted by the transmitter FBK instance to the RRM unit in order to request resource for feedback information for the receiver FBK instance. Preferably, this message specifies both receiver FBK instance and transmitter FBK instance identifiers, and the amount of requested resource. In a preferred embodiment of the invention, the receiver FBK instance does not directly send any messages to the RRM unit.

RFA feedback operational mode

As already described above, the RFA feedback operational mode is selected advantageously while no error is detected on received PDUs. During this feedback operational mode, the receiver FBK instance transmits feedback information only when one of the following conditions occurs:
  a) on the transmitter FBK instance side, the TTL timer of the Tx-BoW PDU becomes lower than a defined threshold $T_{TTL}$. This threshold will be fixed according to the time elapsed between an error detection in the receiver FBK instance and an effective packet retransmission by the transmitter FBK instance;

b) on the transmitter FBK instance side, the distance between Tx-BoW and Tx-LiW has exceeded a given threshold W. This threshold shall be fixed according to the mean or instant throughput of the data flow in order to avoid a sliding window closing in the transmitter FBK instance;

c) on the receiver FBK instance side, a corrupted or missing PDU has been detected.

Regarding the conditions a) and b), the transmitter FBK instance shall request some resource to the RRM unit for feedback information. If the Explicit feedback reply method is implemented in the receiver FBK instance, the transmitter FBK instance transmits a RFB message to the receiver FBK instance. In Explicit or Implicit feedback reply method, the receiver FBK instance sends a SF message as soon as the RRM unit allocates a dedicated access resource for the receiver FBK instance. The condition b) prevents the transmitter FBK instance window from closing, and guaranties the SN coherency in the receiver FBK instance.

Regarding the condition c), the receiver FBK instance transmits a SF message via a contention access resource to the transmitter FBK instance after the detection of corrupted or missing PDUs. A sufficient number of contention access resources are preferably allocated by the RRM unit so that the MAC layer in the receiver FBK instance is able to correctly transmit these messages to the transmitter FBK instance without too many collisions. The transmitter FBK instance listens to the contention access resource during the RFA feedback operational mode. Upon reception of a SF message that indicates one or more corrupted PDUs, the transmitter FBK instance switches to the NFA feedback operational mode.

When the transmission of feedback information via a contention access resource, described in the condition c), fails because of collisions, the condition a) allows to switch to the NFA feedback operational mode. Consequently, the retransmission of the corrupted PDUs is guarantied before the expiration of the corresponding TTL timers.

NFA feedback operational mode

The NFA feedback operational mode is mainly used during periods of errors. In such a mode, the receiver FBK instance transmits a SF or DF message to the transmitter FBK instance via a dedicated access resource granted by the RRM unit. The resource for feedback is requested by the transmitter FBK instance based on the $N_{RTx}$ information received in the last feedback information message. The corresponding resource allocation can partially or totally be performed by the RRM unit within a maximum delay, so that the receiver FBK instance is able to list the missing or corrupted PDUs in one or more DF messages. If the Explicit feedback reply method is implemented, the transmitter FBK instance will transmit a RFB message. The transmitter FBK instance manages a timer on feedback reception to protect the FBK function against signalling message loss.

Figure 4:
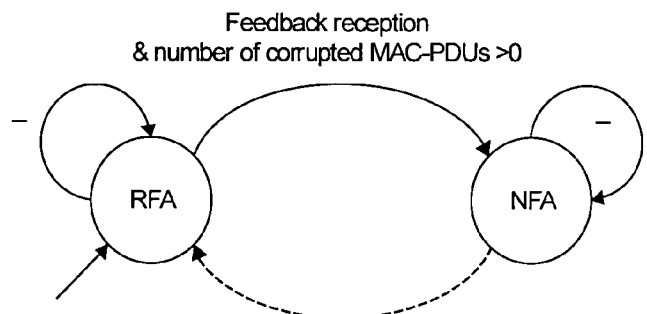
FIG. 4 shows a state machine in the transmitter FBK instance illustrating the switching conditions between two feedback operational modes according to one embodiment of the invention.

FIG. 4 illustrates a state machine indicating the triggering events of switching between the RFA mode and the NFA mode in the transmitter FBK instance. A switching from the RFA mode into the NFA mode is triggered by the reception of a feedback information message indicating that at least one corrupted or missing PDU has been detected on the receiver FBK instance side. On the other hand, a switching from the NFA mode into the RFA mode is triggered by the reception of a given number N of consecutive feedback information messages indicating no transmission error.

At this step of the description, a list of signalling messages and both feedback operational modes have been described. Next sections will detail the operations performed respectively by the transmitter FBK instance, the receiver FBK instance and the RRM unit.

Transmitter FBK instance operations

The operations are described for the Implicit feedback reply method only. They can be easily extended for the explicit feedback reply method by supposing that the transmitter FBK instance transmits a RFB message to the receiver FBK instance when a feedback information message is expected.

Preferably, the following variables are handled by the transmitter FBK instance:

a $N_{BwdReq}$ state variable which represents the number of resource needed in the backward direction. This variable is used each time a RRS message is sent by the transmitter FBK instance to the RRM unit in order to request resource in the backward direction;

a $S_{FAP}$ state variable which is the current feedback operational mode used by the transmitter FBK instance and that is determined from the state machine illustrated in FIG. 4, as described below;

a $T_{Tx,Fb}$ variable which is a transmitter timer used to measure the time elapsed between the reception of successive feedback messages in the NFA operational mode only and which is armed or re-armed with the static value $T_{Tx,MaxFb}$, this static value being preferably greater than the RRM maximum allocation delay (i.e. time between resource request and the corresponding resource allocation).

The transmitter FBK instance operating in the RFA mode, i.e. when the variable $S_{FAP}$ is equal to RFA, transmits an RRS to the RRM unit when the conditions a) or b) are met, which RRS preferably specifies an amount of resource corresponding to an SF. Consequently, the RRM unit allocates a dedicated access resource to the receiver FBK instance and then the receiver FBK instance is able to transmit a SF.

On reception of a SF message indicating a corrupted or lost PDU, the $N_{BwdReq}$ variable is updated based on the $N_{RTx}$ information included in the SF message. When the feedback operational mode changes to NFA, the variable $S_{FAP}$ becomes equal to NFA and the transmitter FBK instance transmits a RRS message to the RRM unit in order to request resource in the backward direction. The timer $T_{Tx,Fb}$ is armed.

The transmitter FBK instance operating in the NFA mode, i.e. when the variable $S_{FAP}$ is equal to NFA, updates the $N_{BwdReq}$ variable upon reception of each feedback information message, based on the corresponding $N_{RTx}$ information. In addition, the transmitter FBK instance transmits a RRS message to the RRM unit in order to request resource in the backward direction and the timer $T_{Tx,Fb}$ is re-armed.

The operational mode changes to RFA after the reception of a given number $N_{RFA}$ of consecutive feedback information messages indicating that no PDUs have been detected as corrupted or missing on the receiver FBK instance side.

On the expiration of the $T_{Tx,Fb}$ timer, the transmitter FBK instance transmits a RRS message to the RRM unit in order to request resource in the backward direction based on the current value of the $N_{BwdReq}$ variable. Then, the $T_{Tx,Fb}$ timer is re-armed.

As already mentioned above, the $N_{BwdReq}$ state variable is updated based on the $N_{RTx}$ information received in each feedback message. For a given number $N_{RTx}$ greater than 0, the $N_{BwdReq}$ variable reflects the amount of resource required to transport a DF message that contains a list of $N_{RTx}$ SNs of corrupted or missing PDUs. For a given number $N_{RTx}$ equal to 0, $N_{BwdReq}$ reflects the amount of resource required to transport a SF message.

Receiver FBK instance Operations

After the description of the transmitter FBK instance operations proposed above, this section details the operations performed by the receiver FBK instance. The latter handles a timer $T_{Rx,Fb}$ to improve the robustness of the feedback information transmission by triggering a feedback information transmission via a contention access resource. The timer is preferably armed or re-armed with the static value $T_{Rx,MaxFb}$ greater than $T_{Tx,MaxFb}$ timer value.

The receiver FBK instance transmits a feedback message to the transmitter FBK instance upon different events. In the explicit method, a feedback message is transmitted when a dedicated access resource is granted in the backward direction and when a RFB message has been received from the transmitter FBK instance. In the implicit method, a feedback message is transmitted each time a dedicated access resource is granted in the backward direction. In both methods, the receiver FBK instance uses the allocated resource to list the SNs of the corrupted or missing PDUs through a DF message. If the granted resource is not sufficient to describe all those PDUs, only a sub-set of those PDUs is listed in the DF message and the $N_{RTx}$ information contains the number of PDUs that remains to be listed. If the sub-set is empty due to a lack of granted resource or absence of corrupted PDUs, a simple SF message is sent by the receiver FBK instance.

A SF message is sent to the transmitter FBK instance via a contention access resource when the $T_{Rx,Fb}$ timer expires and at least one corrupted or missing PDU is detected. If a collision occurs during this feedback transmission, a back-off mechanism defined by a contention access procedure allows to repeat the SF message. In this case, the information in the SF message is updated taking into account the current state of the receiver FBK instance. During this repetition procedure, the $T_{Rx,Fb}$ timer is frozen so that there is no interference between back-off and timer expiration. Each time a feedback message is transmitted via a dedicated access resource, the $T_{Rx,Fb}$ timer is re-armed. When a feedback message is transmitted via a contention access resource, the $T_{Rx,Fb}$ timer is re-armed upon successful contention access.

RRM operations

This section details the operations performed by the RRM unit. The RRM unit maintains a variable $N_{Req}$ that contains the number of requested resource that have not been granted yet, for each couple composed by a transmitter FBK instance and a receiver FBK instance. On reception of an RRS message, the RRM updates this variable $N_{Req}$ with the RSS message field that indicates the number of requested resource.

The RRM unit shall allocate the requested resource along the successive FTIs by taking into account the requirements of all STAs of the cell.

The following sections will disclose some exemplary applications of one embodiment of the present invention, where the implicit feedback reply method is applied. However, as it has been already explained, it is easy to extend the same examples in the case of the explicit feedback reply method.

Figure 5:
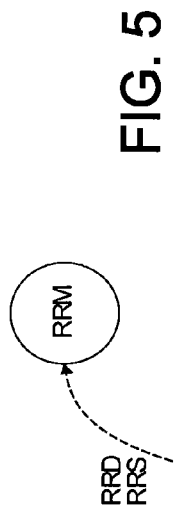
FIG. 5 shows the network entities exchanging signalling messages according to one embodiment of the invention.

FIG. 5 is a view of message exchanges between the network entities considered herein, where only the transmitter FBK instance requests resource for data and requests resource for feedback of the receiver FBK instance by respectively sending a Request Resource for Data (RRD) message and a RRS message to the RRM unit.

Figure 6:
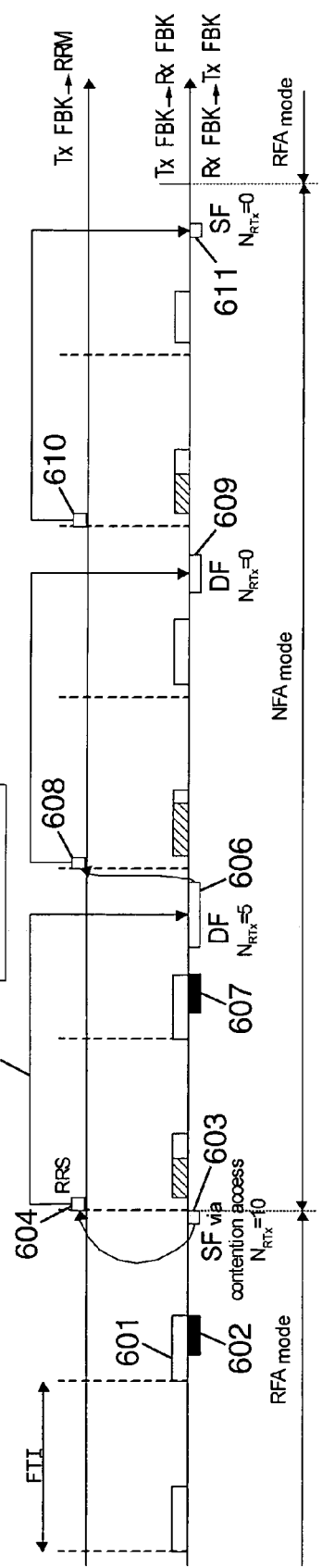
FIG. 6 illustrates the transition between both RFA and NFA operational modes depending on data corruption detection by the receiver FBK instance according to one embodiment of the present invention.

FIG. 6 illustrates the transition between both operational modes when a transmission error is detected by the receiver FBK instance. In this example, the number $N_{RFA}$ of the consecutive feedback messages indicating no transmission error needed to switch from the NFA mode to the RFA mode is equal to 1. Initially, the FBK function has selected the RFA mode. The transmitter FBK instance transmits PDUs 601 to the receiver FBK instance. The receiver FBK instance detects an error in the received packet 602. The receiver FBK instance operates in the RFA mode. As the $T_{Rx,Fb}$ timer has expired and a transmission error is detected, the receiver FBK instance transmits a SF message 603 to the transmitter FBK instance via a contention access resource. This message indicates that 10 packets have been received corrupted or have not been received. The transmitter FBK instance transmits to the RRM unit a RRS message 604 on the reception of this SF message. Consequently, the RRM unit allocates a given dedicated access resource to the receiver FBK instance 605. The receiver FBK instance transmits a DF message 606 via the given resource. This DF message informs about the number of 5 corrupted or missing PDUs 607. On reception of this DF message, the transmitter FBK instance transmits a RRS message 608 to the RRM unit. The RRM unit allocates a given resource to the receiver FBK instance. A DF message 609 is transmitted via this given resource to inform the transmitter FBK instance about the latest corrupted packet identifiers. As no transmission error has been detected, this DF message indicates that no extra resource is required for a further DF message. Consequently, the transmitter FBK instance requests again a feedback resource 610 intended for the receiver FBK instance for an SF message transmission. As the SF message 611 indicates again that no transmission error has been detected and as the $N_{RFA}$ is equal to 1, the operational mode is switched to RFA.

Figure 7:
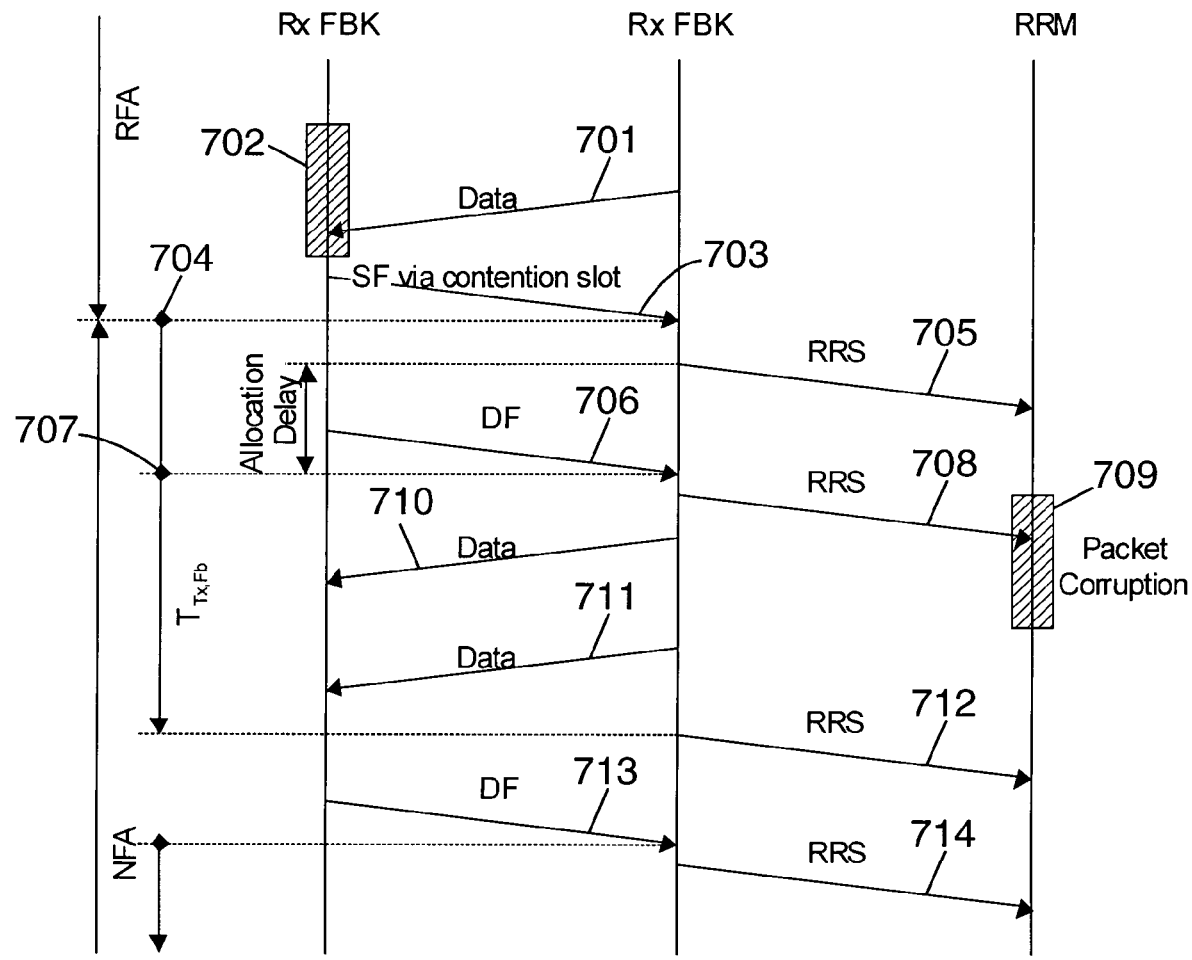
FIG. 7 illustrates a usage of the $T_{Tx, Fb}$ timer as a triggering event for a feedback resource allocation in one embodiment of the present invention.

FIG. 7 illustrates a usage of the $T_{Tx,Fb}$ timer as a triggering event for a feedback resource allocation in one embodiment of the present invention, especially in case of loss signalling message. At the beginning of the example, the RFA mode has been selected by the FBK function. The transmitter FBK instance transmits to the receiver FBK instance a data packet message 701. Upon reception of this message 701, the receiver FBK instance detects that the received data packet is corrupted 702. As the RFA mode is selected, the receiver FBK instance transmits a SF message to the transmitter FBK instance via a contention access resource 703. The transmitter FBK instance receiving the SF message 703 starts the $T_{Tx,Fb}$ timer 704 and transmits a RRS message 705 to the RRM unit. As a result, the RRM unit allocates a dedicated access resource to the receiver FBK instance. Then, the receiver FBK instance is able to transmit a DF message 706 via the dedicated access resource. Upon reception of the DF message 706, the transmitter FBK instance restarts the $T_{Tx,Fb}$ timer 707 and transmits a RRS message 708 to the RRM unit. A transmission error 709 occurs during the transmission of this message preventing the RRM unit from handling this request. The transmitter FBK instance continues to transmit data packet messages 710 and 711. Then the $T_{Tx,Fb}$ timer expires. Consequently, the transmitter FBK instance transmits a new RRS message 712 to the RRM unit. AS a result, the RRM unit allocates a dedicated access resource to the receiver FBK instance and the receiver FBK instance is able to send a DF message to the receiver FBK instance.

Figure 8:
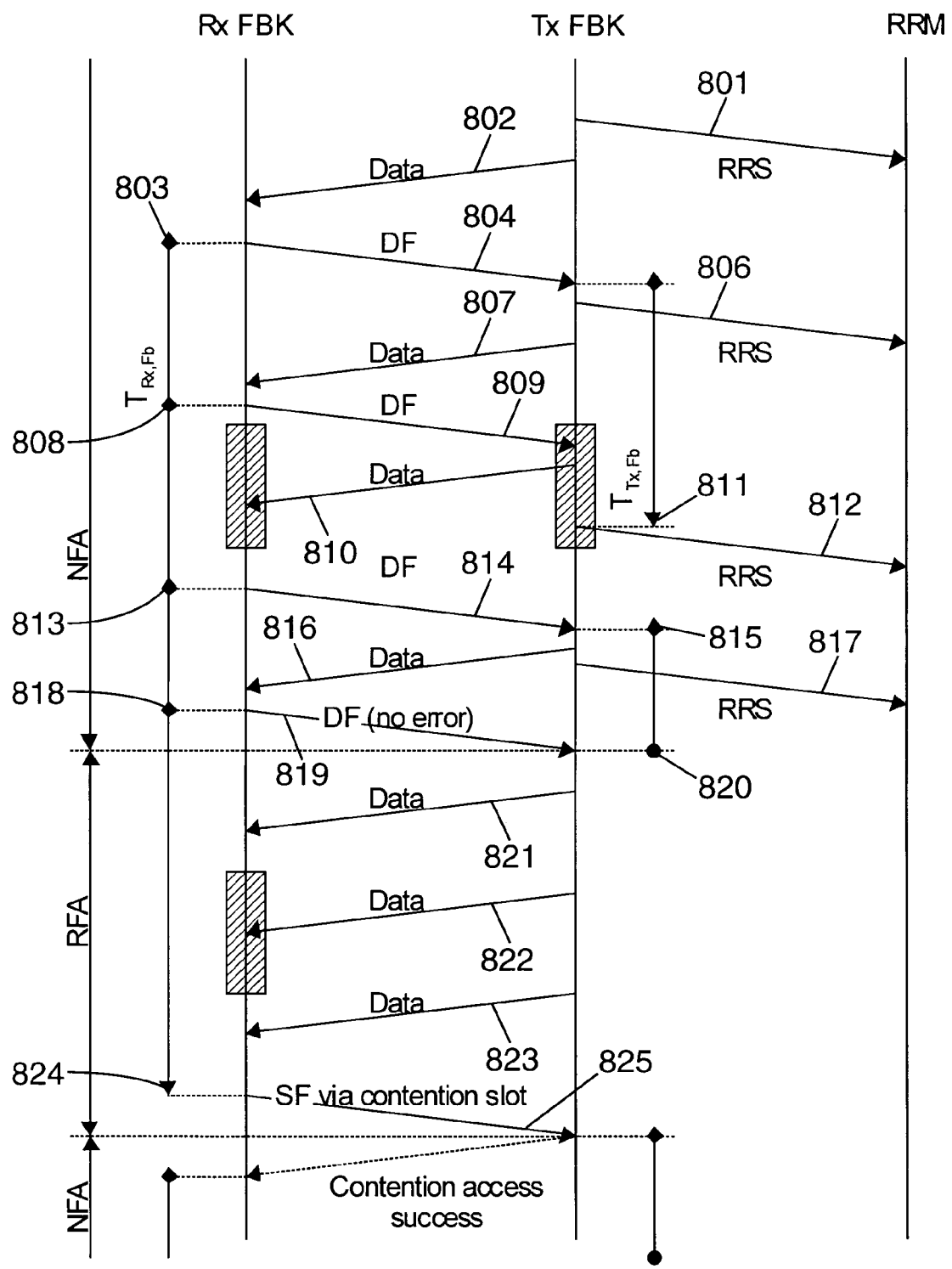
FIG. 8 illustrates the usage of the $T_{Rx, Fb}$ timer after an operational mode switching from the NFA to the RFA mode according to one embodiment of the invention.

FIG. 8 illustrates the usage of the $T_{Rx,Fb}$ timer after an operational mode switching form the NFA to the RFA. In this case, a feedback information message is transmitted via a contention access resource upon the expiration of the timer $T_{Rx,Fb}$. Besides, the $T_{Rx,Fb}$ timer is reset when the contention transmission is succeeded, preferably when the transmitter FBK instance has acknowledged the contention access resource. The following section details this example. At the beginning of the example, the operational mode selected is the NFA mode. The transmitter FBK instance sends a RRS message 801 to the RRM unit and then the receiver FBK instance is able to send a DF message 804 via the corresponding dedicated access resource. Upon transmission of the DF message 804 the receiver FBK instance starts the $T_{Rx,Fb}$ timer 803 and upon reception of the DF message 804, the transmitter FBK instance starts the $T_{Tx,Fb}$ timer 805 and sends a RRS message 806 to the RRM unit. The transmitter FBK instance continues to transmit data packets 802 and 807 while the sliding window is not closed. When a resource requested via the RRS message 806 is allocated to the receiver FBK instance, the receiver FBK instance sends a DF message 809 to the transmitter FBK instance. Unfortunately, the transmitter FBK instance is not able to handle this message due to a transmission error. However, the sliding window allows a new data packet transmission 810. But the $T_{Tx,Fb}$ timer expires because the last DF message 809 has not been handled. The expiration of the $T_{Tx,Fb}$ timer triggers a RRS message transmission 812 to the RRM unit. The receiver FBK instance using the corresponding resource sends a DF message 814 while the $T_{Rx,Fb}$ timer is restarted 813. Receiving the DF message 814, the transmitter FBK instance restarts its $T_{Tx,Fb}$ timer 815 and sends a RRS message 817. Again, the receiver FBK instance uses the corresponding dedicated resource to send a DF message 819 while the $T_{Rx,Fb}$ timer is restarted 818. Upon reception of the DF message 819 indicating that no transmission error has occurred, the FBK function switches from the NFA mode into the RFA mode. Then the $T_{Tx,Fb}$ timer is no longer handled 820. The transmitter FBK instance continues to send data packets 821, 822 and 823. Unfortunately the data packet 822 is detected as corrupted by the receiver FBK instance. As the operational mode is the RFA mode, the receiver FBK instance waits for the expiration of the $T_{Rx,Fb}$ 824 before sending a SF message 825 via a contention access resource. Upon reception of the SF message 825, the FBK function switches from the RFA mode into the NFA mode again.

Some enhancements may be provided with the fact that one of the transmitter FBK instance and the receiver FBK instance is co-located with the RRM unit. When the transmitter FBK instance is co-located with the RRM unit, the RRS message transmitted by the transmitter FBK instance becomes an internal request. Consequently, the latency of resource allocation for feedback is reduced of the duration of one FTI. By supposing the RRM unit is able to grant the resource in the FTI following the request, a feedback message can be transmitted in each FTI when in NFA policy.

When the receiver FBK instance is co-located with the RRM unit, the RRS message transmitted by the transmitter FBK instance becomes useless and the following steps are performed, depending on the operational mode. When the FBK function has selected the RFA mode, and when the condition a) or b) is met, a RFB message is sent by the transmitter FBK instance to the receiver FBK instance. Upon reception of the RFB message, the receiver FBK instance will perform an internal RRS request and send a SF message to the transmitter FBK instance. When the condition c) is met, since a RRS request can be internally performed, the RRM unit may grant some dedicated access resource. Consequently, a contention access resource can be avoided. In that case, a DF message is preferably transmitted instead of a SF message.

When the FBK function has selected the NFA mode, the receiver FBK instance requests internally some signalling resource so that it can send the corresponding DF message to the transmitter FBK instance. Moreover, the transmitter FBK instance will send a RFB message to the receiver FBK instance each time the $T_{Tx,Fb}$ expires until the operational mode is switched into the RFA mode.

One embodiment of the present invention can be applied to any type of data transmission whatever the network topology is. It can be applied in a cellular network where data flows are transmitted from or toward an Access Point (AP) that integrates the RRM unit. But it can also be applied to networks that support direct communications between devices such as in wireless ad-hoc networks.

By using two feedback operational modes preferably determined by the transmitter FBK instance FBK function, one embodiment of the invention can reach a very low resource usage dedicated to feedback information transmission when the PHY layer provides an error-free service. However, when some packets are corrupted, the feedback operational mode can be quickly switched from one another, allowing to provide a sufficient and adequate amount of resource for feedback in order to allow fast retransmission. This feature helps decreasing the mean transmission delay provided to any applications. In addition, one embodiment of the invention is able to guaranty a maximum delay for real-time applications, through the usage of the TTL timer, which avoids packet loss due to eventual discard mechanism. The use of timers in the transmitter FBK instance and the receiver FBK instance provides robustness against signalling message loss. The feedback operational mode that is preferably determined by the transmitter FBK instance does not require to be communicated to the receiver FBK instance. Consequently, for that latter purpose, specific signalling messages or specific fields in the feedback messages are not required.

An embodiment of the present invention can be adapted to any defined standard.

Moreover, such a method according to one embodiment of the invention can be easily implemented and can contribute to reduce power consumption in embedded applications. In broadband wireless networks, transmission operations are more expensive in terms of consumed power. On a wireless links, most of the errors generated by the PHY layer are often grouped into bursts. Outside these bursts, the PHY layer often provides an error-free service. Therefore, the RFA operational mode can be selected preferably and can contribute to efficiently decrease the power consumption of the receiver FBK instance.

Finally, a preferred embodiment of the present invention can be profitably adapted to a network that implements a centralised MAC protocol and an EC entity based on a Selective Repeat ARQ scheme. Broadband wireless or Power Line Communications (PLC) networks are realistic examples since they are based on unreliable PHY layer, they support a high number of concurrent applications with variable requirements along the time. The invention is particularly valuable in a Home environment where several devices directly communicate between themselves. It is also efficient for a high throughput system that support a large number of unidirectional data flows such as multimedia streaming (VHS quality video (512kb/s), MP3 streaming (128kb/s), . . . ).

The invention claimed is:

1. A method for controlling transmission errors in a network comprising at least one transmitter, at least one receiver, a Radio Resource Management (RRM) unit for allocating transmission resource dedicated to said transmitter and/or receiver, and a FeedBack (FBK) function comprising a transmitter FBK instance and a receiver FBK instance for managing transmission of feedback information which is transmitted by the receiver to the transmitter to indicate transmission errors, said method comprising the following steps:

a) said transmitter FBK instance transmits Protocol Data Units (PDUs) to said receiver FBK instance;
b) said FBK function monitors transmission errors on the receiver FBK instance side and/or on the transmitter FBK instance side to determine a transmission quality level out of a set of given transmission quality levels;
c) said FBK function selects one feedback operational mode out of a predetermined list of feedback operational modes based on said determined transmission quality level, each one of said feedback operational modes defining a feedback resource allocation scheme for said transmitter FBK instance and said receiver FBK instance;
d) said receiver FBK instance transmits to said transmitter FBK instance feedback information via a resource allocated based on said selected feedback operational mode;
wherein the list of feedback operational modes comprises a Reduced Feedback resource Allocation (RFA) feedback operational mode and a Normal Feedback resource Allocation (NFA) feedback operational mode, wherein the set of transmission quality levels comprises a low quality level and a high quality level, wherein, at step c), said RFA feedback operational mode is selected in case of a high quality level transmission and said NFA feedback operational mode is selected in case of a low quality level transmission.

2. A method according to claim 1, wherein the transmission resource allocated by the RRM unit includes contention access resource.

3. A method according to claim 2, wherein upon detecting said transmitted PDUs, the receiver FBK instance transmits feedback information via a contention access resource which is listened to by the transmitter FBK instance.

4. A method according to claim 2, wherein feedback information is transmitted by the receiver FBK instance via a contention access resource.

5. A method according to claim 2, wherein a DF message is transmitted via a dedicated access resource and a SF message is transmitted via a contention access resource or a dedicated access resource.

6. A method according to claim 1, wherein the transmission resource allocated by the RRM unit is based on a TDMA scheme.

7. A method according to claim 1, wherein the FBK function selects the RFA mode and wherein the FBK function triggers feedback information transmission based on a list of triggering events.

8. A method according to claim 7, wherein the list of triggering events comprises a detection of a corrupted or missing PDU by the receiver FBK instance.

9. A method according to claim 7, wherein the list of triggering events comprises a periodic triggering event provided by a Time To Live (TTL) timer on a per PDU basis, and wherein, for a given PDU for which no feedback information has been received, and when said TTL timer reaches a given threshold value, the transmitter FBK instance requests a dedicated access resource for the receiver FBK instance to transmit feedback information and the receiver FBK instance transmits feedback information to the transmitter FBK instance via said dedicated access resource.

10. A method according to claim 7, wherein the list of triggering events comprises a triggering event provided by a counter of consecutive PDU transmitted for which no feedback information has been received, and wherein: when said counter is greater than a given threshold number, the transmitter FBK instance requests a dedicated access resource allocation for the receiver FBK instance to transmit feedback information; the receiver FBK instance transmits feedback information to the transmitter FBK instance via said dedicated access resource.

11. A method according to claim 1, wherein the FBK function selects the NFA mode, wherein the transmitter FBK instance triggers feedback information transmission at least periodically with a time period T, said method being based on a transmitter timer which has a count value of T and which is managed by the transmitter FBK instance, and wherein: the transmitter FBK instance starts the transmitter timer from an initial value, each time feedback information is received; the transmitter FBK instance requests a dedicated access resource allocation for the receiver FBK instance to transmit feedback information upon expiration of said transmitter timer; the receiver FBK instance transmits feedback information to the transmitter FBK instance via said dedicated access resource.

12. A method according to claim 11, wherein the transmitter FBK instance further triggers feedback information transmission each time feedback information is received, and wherein: the transmitter FBK instance receives feedback information indicating possible transmission errors and resource required for further feedback information transmission; the transmitter FBK instance requests a dedicated access resource allocation for the receiver FBK instance based on said feedback information; the receiver FBK instance transmits a next feedback information via said dedicated access resource.

13. A method according to claim 11, wherein a receiver timer is managed by the receiver FBK instance, said receiver timer has a count value greater than T and is started from an initial value each time feedback information is transmitted to the transmitter FBK instance, and wherein upon both expiration of said receiver timer and the detection of a missing or corrupted PDU, the receiver FBK instance transmits feedback information to the transmitter FBK instance.

14. A method according to claim 1, wherein step c) further comprises: selecting NFA feedback operational mode on reception of feedback information indicating at least one transmission error; or selecting RFA feedback operational mode on reception of a given number M of consecutive feedback informations indicating that no transmission error has occurred.

15. A method according to claim 1, wherein step b) further comprises: inserting a CRC in each PDU by the transmitter FBK instance and, checking said CRC by the receiver FBK instance.

16. A method according to claim 1, wherein the receiver FBK instance transmits feedback information to the transmitter FBK instance each time a dedicated access resource is allocated for the receiver FBK instance.

17. A method according to claim 1, wherein allocation of resource for transmitting feedback information is requested from the RRM unit by the transmitter FBK instance only.

18. A method for controlling transmission errors in a network comprising at least one transmitter, at least one receiver, a Radio Resource Management (RRM) unit for allocating transmission resource dedicated to said transmitter and/or receiver, and a FeedBack (FBK) function comprising a transmitter FBK instance and a receiver FBK instance for managing transmission of feedback information which is transmitted by the receiver to the transmitter to indicate transmission errors, said method comprising the following steps:
a) said transmitter FBK instance transmits Protocol Data Units (PDUs) to said receiver FBK instance;
b) said FBK function monitors transmission errors on the receiver FBK instance side and/or on the transmitter FBK instance side to determine a transmission quality level out of a set of given transmission quality levels;

c) said FBK function selects one feedback operational mode out of a predetermined list of feedback operational modes based on said determined transmission quality level, each one of said feedback operational modes defining a feedback resource allocation scheme for said transmitter FBK instance and said receiver FBK instance;

d) said receiver FBK instance transmits to said transmitter FBK instance feedback information via a resource allocated based on said selected feedback operational mode;

wherein between step c) and step d) the transmitter FBK instance transmits a Request for FeedBack (RFB) message to the receiver FBK instance; at step d) the receiver FBK instance transmits to the transmitter FBK instance feedback information via the next dedicated access resource which is allocated for the receiver FBK instance.

19. A method for controlling transmission errors in a network comprising at least one transmitter, at least one receiver, a Radio Resource Management (RRM) unit for allocating transmission resource dedicated to said transmitter and/or receiver, and a FeedBack (FBK) function comprising a transmitter FBK instance and a receiver FBK instance for managing transmission of feedback information which is transmitted by the receiver to the transmitter to indicate transmission errors, said method comprising the following steps:

a) said transmitter FBK instance transmits Protocol Data Units (PDUs) to said receiver FBK instance;

b) said FBK function monitors transmission errors on the receiver FBK instance side and/or on the transmitter FBK instance side to determine a transmission quality level out of a set of given transmission quality levels;

c) said FBK function selects one feedback operational mode out of a predetermined list of feedback operational modes based on said determined transmission quality level, each one of said feedback operational modes defining a feedback resource allocation scheme for said transmitter FBK instance and said receiver FBK instance;

d) said receiver FBK instance transmits to said transmitter FBK instance feedback information via a resource allocated based on said selected feedback operational mode;

wherein feedback information is transmitted by the receiver FBK instance to the transmitter FBK instance in either a Short Feedback (SF) message or in a Detailed Feedback (DF) message, wherein said DF message comprises a list of identifiers of corrupted or missing PDUs, and said SF and DF messages comprise a given number N of corrupted or missing PDUs that are not specified in said SF or DF message, wherein a receiver FBK instance selects a SF message or a DF message based on the amount of resource available for feedback information transmission.

20. A method according to claim 19, wherein the SF message and the DF message further comprise the following information: an identifier of the first PDU not correctly received by the receiver FBK instance; an identifier of the last PDU received by the receiver FBK instance.

21. A method according to claim 19, wherein the DF message has a variable length and wherein: if said dedicated access resource allows the transmission of the complete list of identifiers, only one DF message is successively transmitted; else, as many DF messages as required are transmitted.

22. A method according to claim 19, wherein the transmitter FBK instance requests a dedicated access resource allocation for feedback information by indicating the following information to the RRM unit: an amount of resource, which is based on the number N of corrupted or missing PDUs that are not specified in said SF or DF message; a transmitter FBK instance identifier; a receiver FBK instance identifier.

23. Device for controlling transmission errors comprising:
transmission means;
at least one receiver means;
means for allocating transmission resource dedicated to said transmission means and/or said receiver means; and
a FeedBack (FBK) function including means for managing transmission of feedback information which is transmitted by the receiver means to the transmitter means to indicate transmission errors; wherein:

a) said transmitter means transmits Protocol Data Units (PDUs) to said receiver means;

b) said FBK function monitors transmission errors to determine a transmission quality level out of a set of given transmission quality levels;

c) said FBK function selects one feedback operational mode out of a predetermined list of feedback operational modes based on said determined transmission quality level, each one of said feedback operational modes defining a feedback resource allocation scheme for said transmitter means and receiver means;

d) said receiver means transmits to said transmitter means feedback information via a resource allocated based on said selected feedback operational mode;

wherein the list of feedback operational modes comprises a Reduced Feedback resource Allocation (RFA) feedback operational mode and a Normal Feedback resource Allocation (NFA) feedback operational mode, wherein the set of transmission quality levels comprises a low quality level and a high quality level, wherein said RFA feedback operational mode is selected in case of a high quality level transmission and said NFA feedback operational mode is selected in case of a low quality level transmission.

* * * * *